US006638636B2

(12) United States Patent
Tucker (10) Patent No.: US 6,638,636 B2
(45) Date of Patent: Oct. 28, 2003

(54) BREATHABLE MULTILAYER FILMS WITH BREAKABLE SKIN LAYERS

(75) Inventor: John David Tucker, Woodstock, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 130 days.

(21) Appl. No.: 09/941,421

(22) Filed: Aug. 28, 2001

(65) Prior Publication Data

US 2003/0077471 A1 Apr. 24, 2003

(51) Int. Cl.$^7$ .......................... B32B 27/32; B32B 27/18
(52) U.S. Cl. .................. 428/515; 428/516; 428/308.4; 428/306.6; 428/316.6; 428/304.4; 428/317.9; 428/910; 264/41; 264/46.2; 264/173.14; 264/173.15
(58) Field of Search ................. 428/516, 515, 428/910, 308.4, 306.6, 316.6, 304.4, 317.9; 264/41, 46.2, 173.14, 173.15

(56) References Cited

U.S. PATENT DOCUMENTS

| | | |
|---|---|---|
| 4,001,172 A | 1/1977 | Steinkamp et al. |
| 4,198,327 A | 4/1980 | Matsumoto et al. |
| 4,338,228 A | 7/1982 | Inoue et al. |
| 4,370,388 A | 1/1983 | Mito et al. |
| 4,440,911 A | 4/1984 | Inoue et al. |
| 4,612,155 A | 9/1986 | Wong et al. |
| 4,678,834 A | 7/1987 | Boivin et al. |
| 4,762,882 A | 8/1988 | Okano et al. |
| 4,960,637 A | 10/1990 | Biczenczuk |
| 5,212,246 A | 5/1993 | Ogale |
| 5,229,456 A | 7/1993 | Ilenda et al. |
| 5,280,066 A | 1/1994 | Tekkanat et al. |
| 5,300,365 A | 4/1994 | Ogale |
| 5,318,842 A | 6/1994 | Ogale |

(List continued on next page.)

FOREIGN PATENT DOCUMENTS

| | | |
|---|---|---|
| EP | 367613 A2 | 5/1990 |
| EP | 508 415 | 10/1992 |
| EP | 527 447 | 2/1993 |
| EP | 657 502 | 6/1995 |
| EP | 708 144 | 4/1996 |
| WO | 99/17926 | 4/1999 |
| WO | 00/16974 | 3/2000 |
| WO | 00/52094 | 9/2000 |
| WO | 01/00398 | 1/2001 |
| WO | 01/15898 | 3/2001 |
| WO | 01/16228 | 3/2001 |

OTHER PUBLICATIONS

US 5,109,050, 4/1992, Takahashi et al. (withdrawn)

*Primary Examiner*—D. Lawrence Tarazano
(74) *Attorney, Agent, or Firm*—Ralph H. Dean, Jr.

(57) ABSTRACT

A breathable multilayer film having a breathable core layer and at least one skin layer is disclosed. The core layer prepared by from a mixture containing a thermoplastic polymer and a particulate filler and the skin layer or layers are prepared from a mixture of at least two incompatible polymers and a polymer which compatiblizes the incompatible polymers. The addition of the compatiblizer in the skin layer improves the film forming consistency. In addition, the core layer contains voids around the particulate filler and the skin layer or layer has cracks or voids, which provides breathability to the multilayer film. Stretching of the film after the layers are coextruded together forms the voids and/or cracks. The multilayer film of the present invention can be laminated with woven and nonwoven materials and the multilayer film of the present invention, whether or not the films are laminated with other materials, are useful in a wide variety of personal care products, medical garments and other product in which breathability is desired.

30 Claims, 2 Drawing Sheets

U.S. PATENT DOCUMENTS

| | | |
|---|---|---|
| 5,346,756 A | 9/1994 | Ogale et al. |
| 5,443,867 A | 8/1995 | Mehra et al. |
| 5,451,283 A | 9/1995 | Josephy et al. |
| 5,571,864 A | 11/1996 | Bates et al. |
| 5,641,833 A | 6/1997 | Jung et al. |
| 5,695,868 A | 12/1997 | McCormack |
| 5,707,569 A | 1/1998 | Priester et al. |
| 5,710,219 A | 1/1998 | Bates et al. |
| 5,811,493 A | 9/1998 | Kent |
| 5,847,041 A | 12/1998 | Takemura et al. |
| 5,859,071 A | 1/1999 | Young et al. |
| 5,914,184 A | 6/1999 | Morman |
| 5,955,546 A | 9/1999 | Bates et al. |
| 6,015,764 A | 1/2000 | McCormack et al. |
| 6,045,900 A | 4/2000 | Haffner et al. |
| 6,075,179 A | 6/2000 | McCormack et al. |
| 6,087,015 A * | 7/2000 | Cretekos et al. ............ 428/447 |
| 6,096,668 A | 8/2000 | Abuto et al. |
| 6,111,163 A | 8/2000 | McCormack et al. |
| 6,153,701 A | 11/2000 | Potnis et al. |
| 6,156,421 A | 12/2000 | Stopper et al. |
| 6,322,894 B1 * | 11/2001 | Harley et al. ............... 428/447 |
| 2002/0187304 A1 * | 12/2002 | McCormack et al. ....... 428/131 |

\* cited by examiner

BREATHABLE MULTILAYER FILMS WITH BREAKABLE SKIN LAYERS

FIELD OF THE INVENTION

This invention is directed to a breathable multilayer film having a core layer and one or two adjacent skin layers. The core layer contains a mixture of thermoplastic polymer and particulate filler, and is rendered breathable to moisture (water) vapor when the film is stretch-thinned following coextrusion with the skin layer or layers. The skin layer or layers prevent filler particles in the core layer from building up at the die lip during the coextrusion. Cracks, voids, tears and/or breaks are formed in the skin layer or layers during stretching to increase the breathability of the overall film.

BACKGROUND OF THE INVENTION

Breathable stretch-thinned films, and laminates including a breathable film and a nonwoven web, are used in diaper backings, other personal care products, and medical garments. For example, U.S. Pat. No. 5,695,868 issued to McCormack, discloses a breathable film and a breathable, cloth-like film/nonwoven composite which includes the film thermally bonded to a fibrous polyolefin nonwoven web.

Breathable layered films have also been prepared for use in personal care products, diapers and medical related items such as surgical drapes and gowns, as is shown in U.S. Pat. No. 6,075,179 to McCormack et al. In this patent, the film includes a core layer coextruded with one or two adjacent skin layers. The core layer, which accounts for most of the film thickness, can be formed from a mixture of a thermoplastic polymer and optionally including a quantity of a particulate filler. When the film is stretched subsequent to coextrusion, voids form around the filler particles in the core layer. It is believed that the voids allow for concentration diffusion through the porous film. This diffusion is what causes the film to have water vapor breathability. The skin layer or layers account for a minor percentage of the film thickness, and may together constitute less than 15% of the film thickness. As described in the '179 patent, the skin layers can be prepared from a thermoplastic polymer or a blend of polymers. The skin layers serve two main purposes. One purpose is to partially shield the die lips from the core layer during coextrusion, so that the filler particles and polymer from the core layer do not excessively build up at the die lips. Another purpose is to serve as a bonding layer, which facilitates bonding of the coextruded film to a nonwoven web.

One disadvantage of skin layers is that they tend to reduce the moisture vapor breathability of the overall film, since skin layer tends to block the pathways created by the pores in the core layer. The thicker the skin layers, the greater the reduction in breathability. Optimization of skin layer thickness requires providing enough skin layer thickness to control die build-up during extrusion and provide bonding to a nonwoven web, yet the skin layer thickness should not be so great that overall breathability is substantially impaired. This can be a difficult balance to achieve, especially in view of the trend toward more breathable films and laminates.

In U.S. patent application Ser. No. 09/385,988, filed Aug. 27, 1999, by McCormack et al., which is commonly assigned to the Assignee of the present invention, a multilayer breathable film is disclosed. The multilayer laminate comprises a core and at least one skin layer, wherein the layers are coextruded. The core is formed from a mixture of at least one thermoplastic polymer and at least one particulate filler. When the film is stretched subsequent to coextrusion, voids form around the filler particles in the core layer. It is believed that the voids allow for concentration diffusion through the porous film. This diffusion is what causes the film to have water vapor breathability. The skin layer comprises a mixture of two incompatible polymers, wherein the incompatibility of the polymer results in the formation of cracks and/or tears when the laminate film is stretched. There is no suggestion in the '988 application to add a compatibilizer to the incompatible polymers of the skin layer or layers. Breathable films of the '988 application and laminates including the film are disclosed to be useful in a wide variety of person care absorbent articles, medical garments and other similar products.

SUMMARY OF THE INVENTION

The present invention is directed to a breathable, multilayered stretch-thinned film including a core layer and one or two adjacent skin layers. The core layer is made from a mixture of one or more thermoplastic polymers and a particulate filler, such that voids are formed around the filler particles when the film is stretched. The skin layer or layers are formed from a polymer blend comprising at least two incompatible polymers and a compatibilizer. During the coextrusion of the multilayer film, the skin layer(s) maintain integrity, yet, the skin layer(s) crack, break, tear or form voids when the film is stretched.

It has been discovered that the addition of the compatibilizer allows for morphology control of the skin layer during formation, which in turn improves the film consistency of the skin layer.

As a result of the present invention, the skin layers can be made thick enough to adequately prevent extrusion die build-up caused by the particulate filler in the core layer. The skin layers can also be as thick as necessary to provide adequate bonding of the film to a substrate, such as a nonwoven web. Because the skin layers crack, break, tear or form voids during stretching of the film, the skin layers do not significantly impair the moisture vapor breathability of the overall film. In addition, the breathability of the resulting film is less dependent upon the thickness of the skin layers and more dependent on the intrinsic properties of the composition of the skin layer.

Further, the skin of the stretched-thin film has an improved processability and appearance after stretching. The addition of the compatibilizer reduces the presence of "barring" in the skin layer. Barring is the non-uniform stretching of a film wherein portions of area of the film stretch while other areas do not stretch or stretch at a different point in time with the rest of the film.

The present invention also includes a breathable laminate comprising a nonwoven web and the breathable stretched-thinned film. The resulting laminate is breathable and can be used in a wide variety of applications including personal care products, protective covers and medical garments. It has been discovered that the breathable laminates of the present invention have improved bonding characteristics between the breathable stretch-thinned film and the nonwoven web.

The present invention also includes a method of preparing a stretch-thinned breathable film. The method includes the steps of providing a core layer composition containing one or more thermoplastic polymers and a particulate filler, providing a skin layer composition for one or both sides of the core layer, coextruding the core layer composition and skin layer composition together through a die to form a multilayer film having a core layer and at least one skin layer, stretching the film in at least one direction after it leaves the die, and cracking or tearing the skin layer during stretching of the film. An important feature of the method is that the skin layer is cracked or has voids formed during stretching, after it leaves the die, instead of being cracked at the die during extrusion.

Finally, another object of the present invention is to provide a method of preparing a laminate of a nonwoven web and the breathable stretched-thinned film.

TEST PROCEDURE

The following procedure is described for testing of the water vapor transmission rate (WVTR) for the self-regulating films of the invention. This procedure is known as the MOCON procedure.

A suitable technique for determining the WVTR (water vapor transmission rate) value of a film or laminate material of the invention is the test procedure standardized by INDA (Association of the Nonwoven Fabrics Industry), number IST-70.4-99, entitled "STANDARD TEST METHOD FOR WATER VAPOR TRANSMISSION RATE THROUGH NONWOVEN AND PLASTIC FILM USING A GUARD FILM AND VAPOR PRESSURE SENSOR" which is incorporated by reference herein. The INDA procedure provides for the determination of WVTR, the permeance of the film to water vapor and, for homogeneous materials, water vapor permeability coefficient.

The INDA test method is well known and will not be set forth in detail herein. However, the test procedure is summarized as follows. A dry chamber is separated from a wet chamber of known temperature and humidity by a permanent guard film and the sample material to be tested. The purpose of the guard film is to define a definite air gap and to quiet or still the air in the air gap while the air gap is characterized. The dry chamber, guard film, and the wet chamber make up a diffusion cell in which the test film is sealed. The sample holder is known as the Permatran-W Model 100K manufactured by Mocon/Modern Controls, Inc., Minneapolis, Minn. A first test is made of the WVTR of the guard film and the air gap between an evaporator assembly that generates 100% relative humidity. Water vapor diffuses through the air gap and the guard film and then mixes with a dry gas flow which is proportional to water vapor concentration. The electrical signal is routed to a computer for processing. The computer calculates the transmission rate of the air gap and the guard film and stores the value for further use.

The transmission rate of the guard film and air gap is stored in the computer as CalC. The sample material is then sealed in the test cell. Again, water vapor diffuses through the air gap to the guard film and the test material and then mixes with a dry gas flow that sweeps the test material. Also, again, this mixture is carried to the vapor sensor. The computer then calculates the transmission rate of the combination of the air gap, the guard film, and the test material. This information is then used to calculate the transmission rate at which moisture is transmitted through the test material according to the equation:

$$TR^{-1}_{test\ material} = TR^{-1}_{test\ material,\ guardfilm,\ airgap} - TR^{-1}_{guardfilm,\ airgap}$$

Calculations:
 WVTR: The calculation of the WVTR uses the formula:

$$WVTR = Fp_{sat}(T)RH/Ap_{sat}(T)(1-RH))$$

where:

F=The flow of water vapor in cc/min.,
$p_{sat}(T)$=The density of water in saturated air at temperature T,
RH=The relative humidity at specified locations in the cell,
A=The cross sectional area of the cell, and,
$p_{sat}(T)$=The saturation vapor pressure of water vapor at temperature T.

The peel adhesion is determined using the following peel test. In peel or delamination testing a laminate is tested for the amount of tensile force which will pull the layers of the laminate apart. Values for peel strength are obtained using a specified width of fabric, clamp jaw width and a constant rate of extension. For samples having a film side, the film side of the specimen is covered with masking tape or some other suitable material in order to prevent the film from ripping apart during the test. The masking tape is on only one side of the laminate and does not contribute to the peel strength of the sample. This test uses two clamps, each having two jaws with each jaw having a facing in contact with the sample, to hold the material in the same plane, usually vertically, separated by 2 inches to start. The sample size is 4 inches wide by as much length as necessary to delaminate enough sample length. The jaw facing size is 1 inch high by at least 4 inches wide, and the constant rate of extension is 300 mm/min. The sample is delaminated by hand a sufficient amount to allow it to be clamped into position and the clamps move apart at the specified rate of extension to pull the laminate apart. The sample specimen is pulled apart at 180° of separation between the two layers and the peel strength reported as an average of peak load in grams. Measurement of the force is begun when 16 mm of the laminate has been pulled apart and continues until a total of 170 mm has been delaminated. The Sintech 2 tester, available from the Sintech Corporation, 1001 Sheldon Dr., Cary, N.C. 27513, the Instron Model™, available from the Instron Corporation, 2500 Washington St., Canton, Mass. 02021, or the Thwing-Albert Model INTELLECT II available from the Thwing-Albert Instrument Co., 10960 Dutton Rd., Phila., Pa. 19154, may be used for this test. Results are reported as an average of three specimens and may be performed with the specimen in the cross direction (CD) or the machine direction (MD).

DETAILED DESCRIPTION OF THE INVENTION

As used herein, the term "polymer" generally includes, but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations and conformations of the molecule. These configurations include, but are not limited to, isotactic, syndiotactic and random symmetries.

As used herein, the term "breathable" refers to a material which is permeable to water vapor having a minimum WVTR of about 300 g/m²/day. The WVTR of a fabric, in one aspect, gives an indication of how comfortable a fabric would be to wear. WVTR (water vapor transmission rate) is measured as indicated above and the results are reported in grams/square meter/day. However, often applications of breathable barriers desirably have higher WVTRs and breathable barriers of the present invention can have WVTRs exceeding about 300 g/m²/day, 800 g/m²/day, 1500 g/m²/day or even exceeding 3000 g/m²/day.

Figure 1:
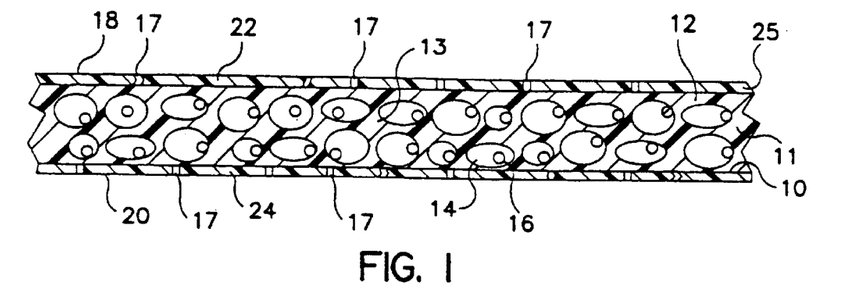
FIG. 1 is a sectional view of one embodiment of the invention, which is a three-layer breathable film.

Referring to FIG. 1, a multilayer breathable film 10 is shown including a stretch-thinned core layer 11 having a voided polymer matrix 12, sandwiched between two outer skin layers 22 and 24. The phrase "voided polymer matrix 12" refers to a polymer matrix which contains open spaces or "voids." Voids 14 within the matrix 12 are at least partly surrounded by thin microporous membranes 13 defining tortuous paths, and one or more filler particles 16 in each void 14. The film 10 is microporous and breathable, as defined by an WVTR of at least about 300 grams/m²/day. The microporous membranes 13 between the voids readily permit molecular diffusion of moisture vapor between first surface 18 and second surface 20 of the film.

The skin layers 22 and 24 include a plurality of cracks 17 which penetrate the skin layers from the outer surfaces 18 and 20 to the interfaces with core layer 11. As used herein, the term "cracks" and variations thereof, includes cracks, tears, splits, breaks and voids formed in the skin layer. The cracks 17 in the skin layers arise during stretch-thinning of the film 10 to cause void formation in core layer 12. Without cracking, the skin layers would inhibit some of the moisture vapor transmission that is facilitated by the void formation in polymer matrix 12. By cracking the skin layers, this inhibition can be reduced to the point where skin layers 22 and 24 do not significantly interfere with moisture vapor transmission. The result is a breathable film 10 having higher overall moisture vapor transmission rates.

Figure 2:
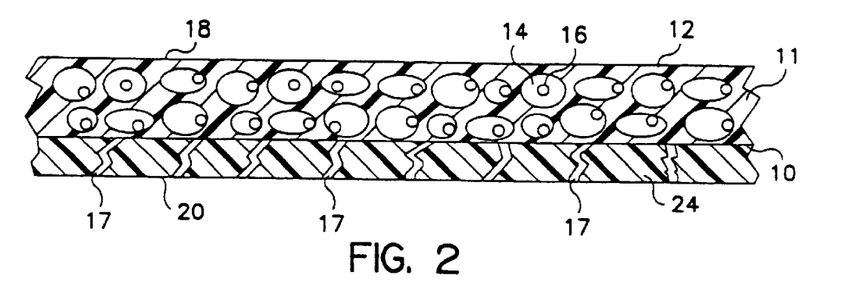
FIG. 2 is a sectional view of another embodiment of the invention, which is a two-layer breathable film.

FIG. 2 illustrates a two-layer breathable film 10 having only one skin layer 24 which is relatively thicker than the skin layers in FIG. 1. The film of FIG. 2 has a voided core layer 11 similar to the core layer shown in FIG. 1. As shown in FIG. 2, the cracks 17 penetrate all the way through the somewhat thick skin layer 24. By forming multiple cracks in skin layer 24, the breathability of the two-layer film can be maintained in spite of the thick skin layer.

The cracked skin layers, which may include a degree of fibrillation, may feel and look more cloth-like than conventional breathable films without cracked surfaces. In applications where a nonwoven fabric layer might otherwise be laminated to the film to provide softness and a cloth-like feel, the cracked skin layers may provide these properties, overcoming the need for a nonwoven fabric layer.

The polymer matrix 12 defining the core layer 11 of the breathable film 10 can be formed from any suitable film-forming thermoplastic polymer. Examples of suitable polymers include, without limitation, polyolefins, such as, for example, polyethylene, polypropylene, copolymers of mainly ethylene and $C_3$–$C_{12}$ alpha-olefins (commonly known as linear low density polyethylene), copolymers of mainly propylene with ethylene and/or $C_4$–$C_{12}$ alpha-olefins, and flexible polyolefins. As used herein, the term "flexible polyolefin" refers to polyolefin materials containing propylene based polymer with controlled regions of atactic polypropylene units to achieve a desired crystallinity, such as described in co-assigned U.S. Pat. No. 5,910,136 to Hetzler and Jacobs; the entire contents of which are incorporated herein by reference in its entirety. Further description of such flexible polyolefins can be found in U.S. Pat. No. 5,723,546 to Sustic and assigned to Rexene Corporation.

Other suitable matrix polymers include, without limitation, elastomeric thermoplastic polymers. Such polymers include those made from block copolymers such as polyurethanes, copolyether esters, polyamide, polyether block copolymers, ethylene vinyl acetates (EVA), block copolymers having the general formula A-B-A' or A-B like copoly(styrene/ethylene-butylene), styrene-poly(ethylene-propylene)-styrene, styrene-poly(ethylene-butylene)-styrene, poly(styrene/ethylene-butylene/styrene) and the like. Specifically, the elastomeric thermoplastic polymers include: polyester elastomeric materials such as, for example, those available under the trade designation HYTREL® from E. I. du Pont de Nemours and Company; polyester block amide copolymers such as, for example, available in various grades under the trade designation PEBAX® from ELF Atochem Inc. of Glen Rock, N.J.; and polyurethane elastomeric materials such as, for example, those available under the trademark ESTANE® from B. F. Goodrich & Co. or MORTHANE® from Morton Thiokol Corporation. Metallocene-catalyzed polyolefins are also useful, including those described in U.S. Pat. Nos. 5,571,619; 5,322,728; and 5,272,236, the disclosures of which are incorporated herein by reference.

Polymers made using metallocene catalysts have a very narrow molecular weight range. Polydispersity numbers (Mw/Mn) of below 4 and even below 2 are possible for metallocene-produced polymers. These polymers also have a controlled short chain branching distribution compared to otherwise similar Ziegler-Natta catalyzed polymers. It is also possible to use a metallocene catalyst system to control the isotacticity of the polymer quite closely.

Commercial production of metallocene polymers is somewhat limited but growing. Such polymers are available from Exxon Chemical Company of Baytown, Tex. under the trade name ACHIEVE® for polypropylene-based polymers and EXACT® and EXCEED® for polyethylene based polymers. Dow Chemical Company of Midland, Mich. has polymers commercially available under the name AFFINITY®. These materials are believed to be produced using non-stereo selective metallocene catalysts. Exxon generally refers to their metallocene catalyst technology as "single site" catalyst while Dow refers to theirs as "constrained geometry" catalysts under the name INSITE® to distinguish them from traditional Ziegler-Natta catalysts which have multiple reaction sites. Other manufacturers such as Fina Oil, BASF, Amoco, Hoechst and Mobil are active in this area and it is believed that the availability of polymers produced according to this technology will grow substantially in the next decade.

In the practice of the instant invention, polyolefins are preferred for the core matrix, and polyethylenes are most preferred. Of the polyethylenes available, predominately linear low density polyethylenes are the most preferred. As used herein, "linear low density polyethylene" is meant to include polymers of ethylene and higher alpha olefin comonomers such as $C_3$–$C_{12}$ and combinations thereof. By "predominately linear" it is meant that the main polymer chain is linear with less than approximately 5 long chain branches per 1000 ethylene units. Long chain branches would include carbon chains greater than $C_{12}$. Commercially available linear low density polyethylenes are available from Dow Chemical Company under the trade designation DOWLEX®.

Blends of different polyolefins, such as a blend of linear low density polyethylene and a low density polyethylene are also useful in the present invention. Such blends can be used in any proportions of the polymers, however, each polymer desirably present in the blend in an amount of at least 20 wt. %, based on the weight of the polymers, so that the properties or advantages of the particular polyolefin are present in the blend.

The polymer matrix should constitute about 20–80% by weight of the core layer 11, preferably about 25–65% by weight, most preferably about 30–50% by weight, with the balance of the weight coming mainly from filler particles 16.

The polymer composition, filler content, filler particle size and degree of stretching are factors which help determine the breathability of the microporous core layer 11, thus influencing the breathability of multilayer film 10. Generally, the breathable film 10 will be less than about 50 microns thick, preferably less than about 30 microns thick, most preferably less than about 20 microns thick.

The filler content and degree of stretching affect the number of voids and the nature of the tortuous paths between the voids. The total filler content should range from about 20–80% by weight of the core layer 11, preferably about 35–75% by weight of the core layer 11, most preferably about 50–70% by weight of the core layer 11. The film 10 may be uniaxially or biaxially stretched. The film may be uniaxially stretched to about 1.1–7.0 times its original length, preferably to about 1.5–6.0 times its original length, most preferably to about 2.5–5.0 times its original length. The film may alternatively be biaxially stretched using conventional techniques familiar to persons skilled in the art. If the film is biaxially stretched, the film can be stretched about 1.1 to about 7 times in the cross-direction. Stretching temperatures may range from about 38–150° C. depending on the specific polymers employed, and are generally about 70–95° C.

The filler particles 16 are preferably small, in order to maximize vapor transmission through the voids. Generally, the filler particles should have a mean particle diameter of about 0.1–10.0 microns, preferably about 0.5–7.0 microns, most preferably about 0.8–2.0 microns.

The filler particles 16 in core layer 11 may be selected from a wide variety of organic and inorganic fillers. Suitable fillers include without limitation calcium carbonate ($CaCO_3$), various kinds of clay, silica ($SiO_2$), alumina, barium sulfate, sodium carbonate, talc, magnesium sulfate, titanium dioxide, zeolites, aluminum sulfate, cellulose-type powders, diatomaceous earth, magnesium sulfate, magnesium carbonate, barium carbonate, kaolin, mica, carbon, calcium oxide, magnesium oxide, aluminum hydroxide, pulp powder, wood powder, cellulose derivative, polymer particles, chitin and chitin derivatives. The filler particles 16 may be treated with treating agent such as a fatty acid or other material to ease their dispersion in the polymer matrix. Suitable fatty acids include without limitation stearic acid, or a longer chain fatty acid such as behenic acid. Typically, the fillers are treated with up to about 10% by weight of the treating agent, more preferably up to about 2% by weight, based on the weight of the filler.

The skin layers 22 and 24 should be only as thick as is reasonably necessary to provide the dual functions of alleviating filler die build-up during coextrusion, and later bonding the film 10 to a substrate. Otherwise, the skin layers should be as thin as possible, so that the breathable core layer 11 may heavily influence and/or control the breathability of the multilayer film 10. Ideally, the overall film 10 should have a water vapor transmission rate ("WVTR") of at least about 500 grams/$m^2$/day, measured using the procedure described above. Preferably, the film 10 should have an WVTR of at least about 1500 grams/$m^2$/day, more preferably at least about 3000 grams/$m^2$/day.

The skin layers 22 and 24 may have varying thickness as required for individual applications. While it is generally desirable to maximize breathability through the use of thin skin layers, the cracking, breaking or void forming of the skin layers during stretching allows more latitude for using thicker skin layers where desired. Where two skin layers 22 and 24 are employed in a three-layer film, their combined thickness may range from about 1–30% of the total film thickness, desirably about 2–15% of the total film thickness, preferably about 3–5% of the total film thickness. Each individual skin layer may have a thickness ranging from about 0.5–15% of the total film thickness, desirably about 1–7.5% of the total film thickness, preferably about 1.5–2.5% of the total film thickness. Where only one skin layer 24 is employed in a two-layer film, its thickness may constitute about 0.5–30% of the total film thickness, desirably about 1–15% of the total film thickness, preferably about 1.5–5% of the total film thickness.

The skin layers 22 and 24 crack, break, tear or form voids during stretching of the film. Stated another way, the skin layers maintain their integrity and should not crack during coextrusion from a die, so that they may best perform their function of minimizing die build-up of filler particles 16 from the core layer 11. The cracking, breaking or void formation of the skin layers should occur during the subsequent stretching of the film 10. The stretching imparts breathability to the film 10 both by forming voids 14 around filler particles 16 in the core layer, and by forming cracks and/or voids 17 in the one or two skin layers. The cracks, breaks or voids in the skin layers pass through the skin layers, i.e., have a depth equal to the thickness of each skin layer. The cracks, breaks or voids 17 should have a length of at least about 0.1 mm., desirably about 0.3–10 mm, suitably about 0.5–5 mm. Also, the cracks or voids 17 should occur at a fairly high frequency. Generally, the average distance between cracks, tears, breaks or voids 17 (i.e., the average distance from each crack, tear, break or void to the nearest adjacent crack, tear, break or void) measured in the direction of stretching should be less than about 10 mm, desirably less than about 5 mm, suitably less than about 1 mm.

In accordance with the invention, skin layers 22 and 24 are each constructed from two or more incompatible polymers and a compatibilizer blended together. As used herein, the term "incompatible polymers" refers to polymers which not intimately mixed. Incompatible polymers of the present invention have differences in the polymer solubility parameter ($\delta$) which may be used to select suitably incompatible polymers. The polymer solubility parameters ($\delta$) of different polymers are well known in the art. A discussion of the solubility parameter is, for example, disclosed in Polymer: Chemistry and Physics of Modern Materials, pages 142–145, by J. M. G. Cowie, International Textbook Co., Ltd., 1973. Preferably, mildly incompatible polymers are preferred. The term "mildly incompatible polymers" refers to polymers which are somewhat phase separated. Mildly incompatible polymers have solubility parameters which are relatively close to each other, but are far enough apart that the polymers show some degree of phase separation.

As used herein, the term "compatibilizer" is used to describe a component which is characterized as having separate portions in its molecule, wherein one portion is essentially soluble in or has an affinity for one the immiscible polymers and another portion which is essentially soluble in or has an affinity for another of the immiscible polymers. A compatibilizer lowers the interfacial energy between the blend components by having some affinity for both components. Compatibilizers also allow for energy transfer across the phase boundary. Compatibilizers further enhance the ability to disperse immiscible polymers, however, the extent of the dispersing ability of a particular compatibilizer depends on many different factors. Examples of compatibilizers include, but are not limited to, block copolymers, graft copolymers, star or radial copolymers. In addition, the compatibilizer could also be a compound, either organic or inorganic, such as a filler or a treated filler which has an affinity for the incompatible polymers. Preferably, the compatibilizer is a block or graft copolymer.

The mixture of the incompatible polymer and compatibilzer should tend to crack when in the form of a thin skin layer, when a stretching force is applied. The blend of the incompatible polymers and the compatibilizer should not phase separate at the die lip, causing melt fracture or cracking at the die. Instead, the polymer blend which constitutes the skin layers should flow smoothly through the die, and maintain enough continuity to minimize die build-up from filler particles in the core layer. However, the blend should be sufficiently incompatible to result in separation and cracking in the skin layers when the multilayer film is stretched using the conditions set forth above, and the process described below.

The skin layer, in its simplest terms, comprises a first polymer, a second polymer, and a third polymer wherein the first polymer and second polymer are incompatible with each another and the third polymer is a compatibilizer for the first polymer and the second polymer. As used herein, the phrases "first polymer" and "second polymer" are intended to encompass mixtures of polymers as well as a single polymer component. Therefore, the first polymer can be a single polymer or a mixture of two or more polymers. In addition, second polymer of the skin layer can be a single polymer or a mixture of two or more polymers. When the first and/or second polymer is a mixture of polymers, it is important to note the mixture of polymers should be incompatible with the polymer component or components of the other incompatible polymer of the skin layer. That is, for example, a mixture of polymers making up the first polymer should be incompatible with the second polymer or mixture of polymers making up the second polymer.

The first polymer comprises about 1% to about 98% by weight of the skin layer, the second polymer comprises about 1% to about 98% by weight of the skin layer, and the compatibilizer comprises about 0.1% to about 20% by weight of the skin layer. Preferably, the skin layer comprises about 20% to about 79% by weight of the first polymer, about 20% to about 79% by weight of the second polymer, and about 1% to about 15% by weight of the compatibilizer. More preferably, the skin layer comprises about 35% to about 64% by weight of the first polymer, about 35% to about 64% by weight of the second polymer, and about 1% to about 10% by weight of the compatibilizer. Most preferably, the first polymer comprises about 55% to about 64% by weight of the skin layer, the second polymer comprises about 35% to about 44% by weight of the skin layer, and the compatibilizer comprises about 1% to about 3% by weight of the skin layer.

Selection of the first and second polymers is not entirely critical to the present invention. It is critical, however, that the polymers are selected so that the first and second polymers are incompatible with one another, hence the selection of the first polymer will dictate or narrow the possible choices for the second polymer. In addition, it is preferred, but not required, that the polymers are selected so that at least one component of the skin layer has peel adhesion with the polymeric component of the core or, in the alternative, it is preferred that one of the incompatible polymers of the skin layer is selected to have peel adhesion with a nonwoven web which may be attached to the multilayer laminate.

The first polymer can be any thermoplastic polymer, as can the second polymer. Again, it is pointed out that the first and second polymers must be selected so that the polymers are incompatible with each other. Examples of thermoplastic polymers include, but not limited to, polyolefins, polyesters, polyamides, polyvinyl alcohol, polystyrene, polyurethanes, etc. Examples of polyolefins include, but are not limited to, polyethylene, polypropylene, polybutylene, copolymers of mainly ethylene and $C_3$–$C_{12}$ alpha-olefins (commonly known as linear low density polyethylene), copolymers of mainly propylene with ethylene and/or $C_4$–$C_{12}$ alpha-olefins, and other homopolymers, copolymers, terpolymers and blends thereof.

In a preferred embodiment of the present invention, at least one of the first polymer and the second polymer is a polyolefin. Examples of preferred polyolefins include, but are not limited to, a ethylene-propylene copolymer elastomer containing a major percentage of propylene and a minor percentage of ethylene, heterophasic propylene-ethylene polymers, for instance, heterophasic reactor blends of a) a polypropylene homopolymer or random copolymer with up to about 10% ethylene, b) a propylene-ethylene random copolymer containing about 20–40% ethylene, and c) a propylene-ethylene random copolymer containing over 55% ethylene. Heterophasic propylene-ethylene polymers are described in U.S. Pat. No. 5,453,318, issued to Giacobbe; U.S. Pat. No. 5,368,927, issued to Lesca et al., U.S. Pat. No. 5,331,047, issued to Giacobbe; U.S. Pat. No. 5,318,842, issued to Ogale; U.S. Pat. No. 5,300,365, issued to Ogale; and U.S. Pat. No. 5,212,246, issued to Ogale; the disclosures of which are incorporated by reference. Commercially available polyolefin polymers usable in the present invention include, but are not limited to Basell ADFLEX® Polymer KS350, KS 357 and KS 359. These polymers are prepared in a multistep reactor wherein an amorphous ethylene-propylene random copolymer is molecurarly dispersed in a predominantly semicrystalline high propylene monomer/low ethylene monomer continuous matrix. This process is described in U.S. Pat. No. 5,300,365 to Ogale, which is hereby incorporated by reference.

The second polymer must be at least somewhat incompatible with the first selected polymer and can be any of the polymers mentioned for the first polymer, so long as the second polymer is somewhat incompatible with the first polymer. It will be readily apparent to those skilled in the art what polymers can be used as the second polymer, once the first polymer is selected. For example, if the first polymer is a heterophasic polymer described above, the second polymer may be polymers such as polyurethanes, polyesters, polystyrene, nylon or polyolefins which are incompatible with the heterophasic polymer. If the first polymer is atactic polypropylene, the second polymer could be polyurethanes, polyesters, polystyrene, nylon, cellulose acetate or another polyolefin such as low density polyethylene.

In some embodiments, the skin layers can comprise, as the second polymer, a branched low density polyethylene made using a conventional high-pressure (25,000–50,000 psi) polymerization process. Low density polyethylene (LDPE) are available from Quantum Chemical Company under the designation NA 334, LQA 006 available from Exxon-Mobil or those available from Rexene under the designation 1058 LDPE. Many similar LDPE polymers are commercially available. The branched low density polyethylene can have a density of about 0.910–0.925 grams/cm$^2$, a branching level of about 15–30 equivalent methyl groups per 1000 carbon atoms, and a melting point of about 110–120° C.

The compatiblizer can be any polymer provided that the polymer has separate portions in its molecule, wherein one portion is essentially soluble in or has an affinity for one the incompatible polymers and another portion which is essentially soluble in or has an affinity for another of the incompatible polymers. As will be apparent to those skilled in the art, the selection of the first an second polymers will dictate or limit the types of components which can be used as a compatiblizer. Examples of compatibilizers include, but are not limited to, block copolymers, star or radial copolymers, graft copolymers. Exemplary block copolymers having the general formula A-B-A' or A-B and include, but not limited to, polymers where B is an elastomeric polymer midblock such as a conjugated diene or a lower alkene polymer such as copoly(styrene/ethylene-butylene), styrene-poly(ethylene-propylene)-styrene, styrene-poly(ethylene-butylene)-styrene, (polystyrene/poly(ethylene-butylene)/polystyrene, poly(styrene/ethylene-butylene/styrene) and the like. Other block copolymers include block copolymers having the general formula A-B-A' or A-B, where A and A' are each a thermoplastic polymer endblocks which are similar to the first polymer of the incompatible polymers and the B block is similar to the second polymer and visa versa. Block copolymers are intended to embrace linear, branched and radial block copolymers. In this regard, the radial block and star block copolymers may be designated (A-B)$_m$-X, wherein X is a polyfunctional atom or molecule and in which each (A-B)$_m$-radiates from X in a way that A is an endblock. In the radial block copolymer, X may be an organic or inorganic polyfunctional atom or molecule and m is an integer having the same value as the functional group originally present in X. It is usually at least 3, and is frequently 4 or 5, but not limited thereto. Examples of block copolymers which are useable in the present invention include, but are not limited to a hydrogenated product of a aromatic vinyl-conjugated diene block copolymer (SEBS): such as (polystyrene/poly(ethylene-butylene)/polystyrene) block copolymers, which are available under the trademark KRATON G, for example, KRATON® G 1650, KRATON® G 1652 and KRATON® GX1657 available from Kraton Polymers.

Other polymers, which can be used as a compatibilizer, include graft copolymers. In graft copolymers, the backbone of the graft copolymer should have an affinity for one of the polymers and the graft portion of the graft copolymer should have an affinity for the other incompatible polymer. Examples of graft copolymes include, but are not limited to, acid or anhydride grafted polyolefins, such as acrylic acid grafted polyethylene, or maleic anhydride grafted polyproplyene. Other graft copolymers can be used in the present invention, depending on the selection of the first and second incompatible polymers.

Other compatibilizers include copolymers such as EPDM (ethylene-propylene-diene monomer). It has been discovered the EPDM is effective as compatibilizer when one of the incompatible polymers is low density polyethyene and the other incompatible polymer is based on polypropylene. Commercially available EPDM include Buna 2070P or Buna 2470 available from Bayer Chemical and Vistalon 7800 available from Exxon-Mobil.

To assist those skilled in the art to better understand the invention, some possible combinations of polymers for the first polymer, the second polymer and compatibilizer include, but are not limited to, the following combinations shown in Table 1

TABLE 1

| First Polymer | Second Polymer | Compatibilzer |
| --- | --- | --- |
| Polypropylene | low density polyethylene | EPDM |
| Polyamide | low density polyethylene | maleic acid grafted polyethylene |
| ADFLEX ® KSO357P | Polystyrene | Kraton 1652 |
| ADFLEX ® KSO357P | polyamide | maleic anhyride grafted polypropylene |

As can be seen in the forgoing examples, the compatibilizer has portions of the polymer which are compatible with the first polymer and portions of the polymer which are compatible with the second polymer. Again, it is pointed out the foregoing is merely exemplary of possible polymer combinations for the skin layer, and is not intended to limit the invention in any way.

Desirably, the incompatible polymers of the skin layer should be selected so that the skin layer will have a high peel adhesion with the core of the breathable film or a high peel adhesion with a nonwoven web which may be laminated to the breathable film, as discussed below. Ideally, the components of the skin layer should be selected so that a high peel adhesion is obtained to both the nonwoven web and the core of the breathable film. For example, if the nonwoven web is prepared from polypropylene, it is desirable that the skin layer contains a polymer or a mixture of polymers containing polypropylene as one of the components.

Further, both the skin layers and/or the core can contain additional components which modify the appearance or physical properties of each layer. For example, stabilizers, process aids, colorants such as dyes or pigments, slip agents, fillers or other known additives can be added to the skin layer and/or the core of the film, provided that the additives do not have a material adverse effect on the properties of the film.

The breathable films of the present invention have WVTRs exceeding about 300 g/m$^2$/day. Preferably, the breathable films have a WVTR of at least 800 g/m$^2$/day, more preferably at least 1500 g/m$^2$/day and most preferably at least 3000 g/m$^2$/day. In addition, the breathable films of the present invention have a peel strength, measure in accordance with the test procedure above of at least 30 grams and preferably at least 40 grams.

Figure 3:
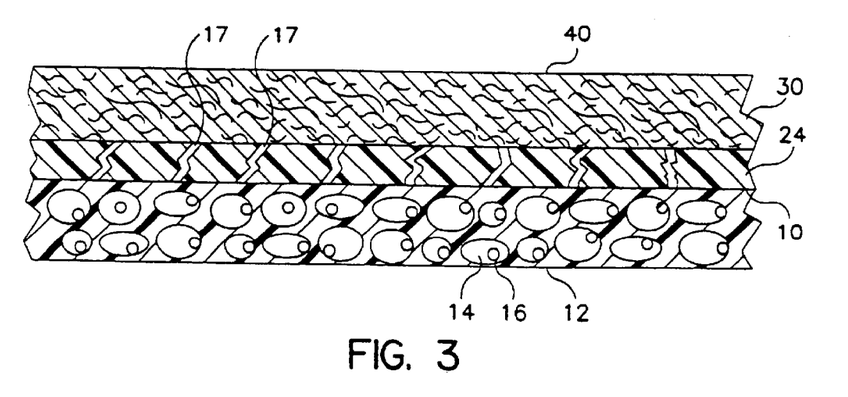
FIG. 3 is a sectional view of a laminate including a breathable film of the invention.

FIG. 3 illustrates a laminate 30 in which the two-layer film 10 of FIG. 2 is laminated by thermal bonding, adhesive bonding, ultrasonic bonding or the like, to a substrate layer 40, which can be a fibrous nonwoven web, for instance, a spunbond or meltblown web. The cracks 17 in the skin layer 24 enhance moisture vapor transmission without interfering with the bonding properties of layer 17.

As used herein the term "nonwoven" fabric or web means a web having a structure of individual fibers or threads which are interlaid, but not in an identifiable manner as in a knitted fabric. Nonwoven fabrics or webs have been formed by many processes such as for example, meltblowing processes, spunbonding processes, hydroentangling, air-laid and bonded carded web processes.

As used herein the term "spunbond fibers" refers to small diameter fibers of molecularly oriented polymeric material. Spunbond fibers may be formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, U.S. Pat. No. 3,542,615 to Dobo et al, and U.S. Pat. No. 5,382,400 to Pike et al. Spunbond fibers are generally not tacky when they are deposited onto a collecting surface and are generally continuous. Spunbond fibers are often about 10 microns or greater in diameter. However, fine fiber spunbond webs (having and average fiber diameter less than about 10 microns) may be achieved by various methods including, but not limited to, those described in commonly assigned U.S. patent applications Ser. No. 08/756,426 filed Nov. 26, 1996 to Marmon et al. and application Ser. No. 08/565,261 filed Nov. 30, 1995 to Pike et al.

As used herein the term "meltblown fibers" means fibers of polymeric material which are generally formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter. Thereafter, the meltblown fibers can be carried by the high velocity gas stream and are deposited on a collecting surface to form a web of randomly dispersed meltblown fibers. Such a process is disclosed, for example, in U.S. Pat. No. 3,849,241 to Butin et al., which is hereby incorporated by reference in its entirety. Meltblown fibers may be continuous or discontinuous, are generally smaller than 10 microns in average diameter, and are generally tacky when deposited onto a collecting surface.

As used herein "multilayer nonwoven laminate" means a laminate of two or more nonwoven layers such as, for example, wherein some of the layers are spunbond and some meltblown such as a spunbond/meltblown/spunbond (SMS) laminate. Examples of multilayer nonwoven laminates are disclosed in U.S. Pat. No. 4,041,203 to Brock et al., U.S. Pat. No. 5,178,931 to Perkins et al. and U.S. Pat. No. 5,188,885 to Timmons et al. Such a laminate may be made by sequentially depositing onto a moving forming belt first a spunbond fabric layer, then a meltblown fabric layer and last another spunbond layer and then bonding the laminate such as by thermal point bonding as described below. Alternatively, the fabric layers may be made individually, collected in rolls, and combined in a separate bonding step.

As used herein, "ultrasonic bonding" means a process performed, for example, by passing the fabric between a sonic horn and anvil roll as illustrated in U.S. Pat. No. 4,374,888 to Bornslaeger.

As used herein "point bonding" means bonding one or more layers of fabric at a plurality of discrete bond points. For example, thermal point bonding generally involves passing one or more layers to be bonded between heated rolls such as, for example an engraved pattern roll and a smooth calender roll. The engraved roll is, patterned in some way so that the entire fabric is not bonded over its entire surface, and the anvil roll is usually flat. As a result, various patterns for engraved rolls have been developed for functional as well as aesthetic reasons. One example of a pattern has points and is the Hansen Pennings or "H&P" pattern with about a 30% bond area when new and with about 200 bonds/square inch as taught in U.S. Pat. No. 3,855,046 to Hansen and Pennings. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5% when new. Another typical point bonding pattern is the expanded Hansen Pennings or "EHP" bond pattern which produces a 15% bond area when new with a square pin having a side dimension of 0.037 inches (0.94 mm), a pin spacing of 0.097 inches (2.464 mm) and a depth of 0.039 inches (0.991 mm). Another typical point bonding pattern designated "714" has square pin bonding areas wherein each pin has a side dimension of 0.023 inches, a spacing of 0.062 inches (1.575 mm) between pins, and a depth of bonding of 0.033 inches (0.838 mm). The resulting pattern has a bonded area of about 15% when new. Yet another common pattern is the C-Star pattern which has, when new, a bond area of about 16.9%. The C-Star pattern has a cross-directional bar or "corduroy" design interrupted by shooting stars. Other common patterns include a diamond pattern with repeating and slightly offset diamonds with about a 16% bond area and a wire weave pattern looking as the name suggests, e.g. like a window screen, with about a 15% bond area. A further pattern is the "s-weave" pattern having about a 17% bond area when new. Typically, the percent bonding area is less than about 50% and more desirably varies from around 10% to around 30% of the area of the fabric laminate web.

The multilayer film 10 may be laminated to one or more substrates, such as, a nonwoven web, using conventional adhesive bonding or thermal bonding techniques known in the art. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91).

Figure 4:
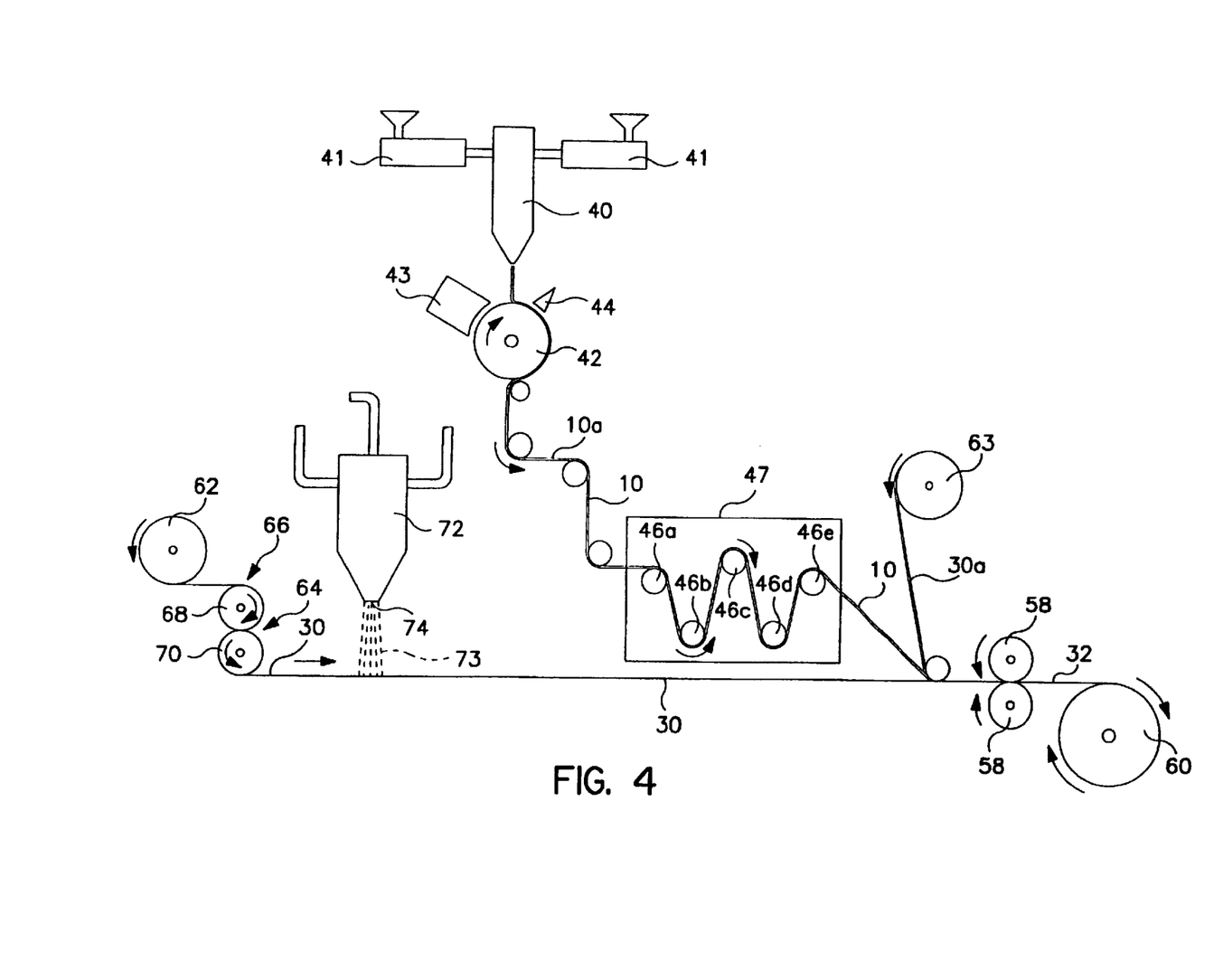
FIG. 4 is a schematic diagram of an integrated process for making a breathable film and laminate of the invention.

The type of substrate and bonding will vary depending on the particular end use application. Referring again to FIG. 4, film 10 may be laminated to nonwoven web 30 immediately after the film is stretched. In one embodiment, a neckable nonwoven web 30, which can be a spunbond web, is unwound from a supply roll 62. The neckable material 30 then passes through the nip 64 of S-roll arrangement 66, formed by a stack of rollers 68, 70, in a reverse S-wrap path as shown by the arrows. Rollers 68 and 70 turn at a slower circumferential speed than downstream calender bonding rollers 58, causing tensioning and neck-in of web 30. The tensioned, necked material can be passed under spray equipment 72 which sprays adhesive 73 through die head 74 onto a surface of web 30. With or without the adhesive treatment, the necked web 30 can then be joined to multilayer film 10 and bonded between calender rollers 58, which can be heated if necessary. The film 10 in FIG. 4 is simultaneously bonded on its other side to a second material 30a originating from supply roll 63. The second material 30a may be a second nonwoven web, or another film layer. The resulting laminate 32 is wound and stored on a supply roll 60.

FIG. 4 illustrates an integrated process for forming a multilayer breathable film and a laminate. Referring to FIG. 4, film 10 is formed from a film coextrusion apparatus 40 such as a cast or blown unit which could be in-line or off-line. Typically the apparatus 40 will include two or three extruders 41. To make the core layer, filled resin including the polymer matrix material and filler is prepared in a mixer (not shown) and directed to an extruder 41. To make each skin layer, similar additional mixing apparatus (not shown) and extrusion apparatus 41 can be used to mix the incompatible polymer components and extrude them as skin layers on one or both sides of the core layers. The multilayer film 10 is extruded onto a chill roller 42, which may be patterned so as to impart an embossed pattern to the newly formed film 10. The film is cooled on the chill roller 42. A vacuum box 43 adjacent the chill roller creates a vacuum on the surface of the chill roller to help maintain the film close to the surface of the chill roller. Air knives or electrostatic pinners 44 also urge the film 10 against the roller surface.

From the film extrusion apparatus 40 or off-line rolls supplied, the multilayer film 10 is directed to a film stretching unit 47 which can be a machine direction orienter, commercially available from vendors including the Marshall and Williams Co. of Providence, R.I. Apparatus 47 has a plurality of stretching rollers 46a–e, which progressively stretch and thin the film in the machine direction, which is the direction of travel of the film. The rollers 46a–e, which are heated to the desired stretching temperature, apply an amount of stress and progressively stretch the multilayer film 10 to a stretched length where the core layer 11 becomes microporous and breathable, and the skin layers 22 and 24 become cracked as explained above. While the apparatus 47 is shown with five stretching rollers 46a–e, the number of rollers may be greater or less depending on the level of stretch desired and the amount of stretching between each pair of rollers.

Advantageously, the film 10 may be uniaxially stretched to about 1.1–7.0 times its original length, preferably about 2–6 times its original length, suitably about 3–5 times its original length, using an elevated stretch temperature of about 38–150° C., preferably about 70–95° C. for most polyolefin-based films. The elevated stretch temperature can be sustained by heating some or all of the stretch rollers 46a–e. The optimum stretch temperature varies with the core layer and skin layer polymers film 10, and is generally below the melting temperature of the matrix polymer in the core layer 11.

The breathable films of the present invention can be used in a wide variety of applications, including, but not limited to, garments, infection control products, personal care products and protective covers. Examples of garments include industrial workwear, coveralls, undergarments, pants, shirts, jackets, gloves, socks, and the like. Infection control products include medically oriented items such as surgical gowns and drapes, face masks, head coverings like bouffant caps, surgical caps and hoods, footwear like shoe coverings, boot covers and slippers, wound dressings, bandages, sterilization wraps, wipers, garments like lab coats, coveralls, aprons and jackets, patient bedding, stretcher and bassinet sheets, and the like. Personal care products include, but not limited to diapers, training pants, absorbent underpants, adult incontinence products, and feminine hygiene products. Examples of protective covers include a cover for vehicles such as cars, trucks, boats, airplanes, motorcycles, bicycles, golf carts, etc., covers for equipment often left outdoors like grills, yard and garden equipment (mowers, roto-tillers, etc.) and lawn furniture, as well as floor coverings, table cloths and picnic area covers.

Other examples of laminates and end uses in which breathable film may be useful are described in various patents and patent applications assigned to Kimberly-Clark Worldwide, Inc. These include without limitation U.S. Pat. No. 6,075,179 to McCormack; U.S. Pat. No. 5,695,868 to McCormack; and U.S. Pat. No. 6,037,281 to Mathis et al. These patents are incorporated herein by reference in their entirety.

EXAMPLES

Example 1.

A multilayer film is prepared by coextruding a core layer with two skin layers. The core layer was made up of 20 wt. % linear low density polyethylene (LLDPE) available under the trade designation Dowlex 2517 manufactured by the Dow Chemical Company ("Dow"), 20 wt. % low density polyethylene (LDPE) available under the trade designation Dowlex 2047AC manufactured by Dow; and 60 wt. % calcium carbonate coated with 1 wt. % behenic acid available under the trade designation FilmLink® 2029 as manufactured by ECC International, Inc. of Sylacauga, Ala. The skin layers were each made up of 58.5% wt. a hetrophasic polyproplyene available under the trade designation Catalloy KS 357 P available from Montell, 39% wt. of styron 615 APR available from Dow Chemical and, as the compatiblizer, 2% wt. of Kraton G1652 available from Kraton Polymers, and a stabilizer.

The three layer film was chill cast extruded. After the film was formed, the film was passed through a Machine Direction Orienter (MDO) to draw the film. The film was stretched to 4.26x and the resulting stretched film has a basis weight of 1.05 ounces per square yard. The film had a WVTR of 6205 g/m$^2$-day as measured by the Test described above. Peel adhesion between the layers of the film was measured in accordance with the test described above and was found to be about 105.7 grams.

Example 2 and Comparative Example 1

A multilayer film is prepared by coextruding a core layer with two skin layers. The core layer was made up of 20 wt. % linear low density polyethylene (LLDPE) available under the trade designation Dowlex 2517 manufactured by the Dow Chemical Company ("Dow"), 20 wt. % low density polyethylene (LDPE) available under the trade designation Dowlex 2047AC manufactured by Dow; and 60 wt. % calcium carbonate coated with 1 wt. % behenic acid available under the trade designation FilmLink® 2029 as manufactured by ECC International, Inc. of Sylacauga, Ala. The skin layers were prepared were prepared from compositions as shown in Table 2.

TABLE 2

| Component | Comp. Example 1 | Example 2a | Example 2b | Example 2c | Example 2d |
|---|---|---|---|---|---|
| ADFLEX 357P (PP/PE Copoly)[1] | 49.75% | 58.82% | 49.02% | 58.82% | 49.02% |
| Escorene LD768.36 (EVA)[2] | 49.75% | — | — | — | — |
| LQA006 (LDPE)[3] | — | 39.02% | 48.78% | 39.02% | 48.78% |

TABLE 2-continued

| Component | Comp. Example 1 | Example 2a | Example 2b | Example 2c | Example 2d |
|---|---|---|---|---|---|
| Buna 2070P (EPDM)[4] | — | 1.95% | 1.95% | — | — |
| Kraton G1652 (SEBS)[5] | — | — | — | 1.95% | 1.95% |
| Stabilizer[6] | 0.50% | 0.49% | 0.49% | 0.49% | 0.49% |

[1]Heterophasic polymer available from Basell
[2]Poly(ethylene vinyl-acetate) available from Shell Chemical Company
[3]Low density polyethylene available from Exxon-Mobil
[4]EPDM available from Bayer Chemical
[5]Hydrogenated styrene-butadiene styrene block copolymer available from Kraton Polymers
[6]B-900 available from Ciba Speciality Chemical.

The peel strength of each film was tested in the center of the resulting film. The peel strength was tested by the method disclosed above. The peel strength for each example is reported in Table 3.

TABLE 3

| Peel Strength | Comp. Example 1 | Example 2a | Example 2b | Example 2c | Example 2d |
|---|---|---|---|---|---|
| Center | 29.45 | 47.91 | 47.12 | 44.97 | 39.90 |
|  | 25.98 | 49.45 | 47.44 | 51.77 | 41.02 |
|  | 28.70 | 50.88 | 45.41 | 43.31 | 37.16 |
|  | 28.57 | 49.82 | 39.56 | 49.73 | 45.46 |
|  | 29.53 | 47.68 | 44.32 | 48.96 | 37.32 |
| ave | 28.17 | 49.52 | 44.88 | 47.45 | 40.89 |
| stdev | 1.44 | 1.34 | 3.18 | 3.50 | 3.39 |

The breathability of each film was tested in accordance with the Mocon procedure described above and is reported in Table 4.

It is further noted that polymeric components of the skin and/or core layer of the film or in the nonwoven webs used in the laminates of the present invention could be derived from reclaimed polymers, although this it is not preferred to do so. As an example of a source of reclaimed polymers, mixtures of incompatible polymers, such as polyethylene and polypropylene are often prepared in the reclaim of films

TABLE 4

| WVTR | Comp. Example 1 | Example 3a | Example 3b | Example 3c | Example 3d |
|---|---|---|---|---|---|
| Left Edge | 5641 | 6497 | 7578 | 5284 | 8011 |
|  | 5462 | 6529 | 6813 | 6291 | 6386 |
|  | 5833 | 6102 | 6570 | 6112 | 6199 |
|  | 5779 | 6562 | 6939 | 5846 | 6671 |
|  | 6042 | 6697 | 6654 | 6064 | 5746 |
|  | 5788 | 7512 | 7546 | 6475 | 6361 |
| Average | 5757 | 6650 | 7017 | 6012 | 6562 |
| Standard Deviation | 194 | 467 | 441 | 416 | 772 |
| Center | 7133 | 9864 | 10940 | 8663 | 9863 |
|  | 6910 | 9284 | 9813 | 9181 | 9140 |
|  | 7698 | 10029 | 9393 | 9182 | 8540 |
|  | 7127 | 9647 | 10254 | 9639 | 9106 |
|  | 7426 | 9412 | 9662 | 8832 | 9422 |
|  | 8219 | 9601 | 10272 | 8816 | 9653 |
| Average | 7419 | 9639 | 10056 | 9052 | 9287 |
| Standard Deviation | 478 | 276 | 552 | 356 | 468 |
| Right Edge | 5884 | 7245 | 7971 | 6182 | 7131 |
|  | 5863 | 6992 | 7071 | 6784 | 7144 |
|  | 5774 | 7079 | 6953 | 6661 | 7086 |
|  | 5996 | 6379 | 7361 | 6407 | 6596 |
|  | 5853 | 5840 | 7181 | 6536 | 7244 |
|  | 5868 | 6554 | 6006 | 6766 | 7055 |
| Average | 5873 | 6681 | 7091 | 6556 | 7043 |
| Standard Deviation | 72 | 527 | 641 | 232 | 228 | and nonwoven fabrics that do not meet specifications. For example, a bicomponent core/sheath or side-by-side used to make a nonwoven fabric could be reclaimed and used in the films or the nonwoven webs used in the laminates of the present invention. In order to use these reclaimed polymers, the polymers will generally have to be compatibilized with each other. Examples of compatibilizers include heterophasic polymer described above, copolymers such as ethylene propylene rubbers, EPDM. However, the compatibilizer generally has to be in an amount of about 20–50% by weight of the resulting composition in order for the resulting composition to have a useful mechanical properties. Layered films comprising a skin layer made from the compatiblized reclaim blend were to be fairly ductile and did not have adequate crack or void formation to guarantee breathability.

As another alternative, for the reclaimed polymer is to use up to about 15% by weight of the reclaimed polymer in virgin polymer if the virgin polymer has a low melt flow resin, such as conventionally polymerized polypropylene. It was discovered that in the case of fiber spinning, the low melt flow resin actually assists spinning by increasing the melt strength. In addition, the bonding of the resulting product of the process is improved due to the presence of the low melt flow resins.

As with the reclaim of fibers, the reclaim of breathable films can also be accomplished and the reclaimed material can be used to produce additional films. However, it is generally necessary to add a compatibilizer to the reclaimed material containing the polymers and the calcium carbonate. Examples of the compatibilizers are desribed above. Adding a compatibilizer to the reclaimed film material, tends to improve the overall toughness of the film produced from the reclaimed material. Properties improved include a greater tear strength, dart impact strength and elongation properties. As a result, the resulting films will tend to have a low breathability and are generally not useable in the present invention.

While the invention has been described in detail with respect to specific embodiments thereof, and particularly by the example described herein, it will be apparent to those skilled in the art that various alterations, modifications and other changes may be made without departing from the spirit and scope of the present invention. It is therefore intended that all such modifications, alterations and other changes be encompassed by the claims.

What is claimed is:

1. A multilayer breathable stretch-thinned film comprising a core layer and a skin layer on at least one side of the core layer wherein
   the core layer comprises a mixture of at least one thermoplastic polymer and a filler; and
   the skin layer comprises a first polymer, a second polymer, and a third polymer wherein the first polymer and second polymer are incompatible with each another and the third polymer is a compatibilizer for the first polymer and the second polymer.

2. The multilayer breathable stretched-thinned film of claim 1, wherein the first polymer comprises about 1% to about 98% by weight of the skin layer, the second polymer comprises about 1% to about 98% by weight of the skin layer, and the compatibilizer comprises about 0.1% to about 20% by weight of the skin layer.

3. The multilayer breathable stretched-thinned film of claim 2, wherein the first polymer comprises about 20% to about 79% by weight of the skin layer, the second polymer comprises about 20% to about 79% by weight of the skin layer, and the compatibilizer comprises about 1% to about 15% by weight of the skin layer.

4. The multilayer breathable stretched-thinned film of claim 3, wherein the first polymer comprises about 35% to about 64% by weight of the skin layer, the second polymer comprises about 35% to about 64% by weight of the skin layer, and the compatibilizer comprises about 1% to about 10% by weight of the skin layer.

5. The multilayer breathable stretched-thinned film of claim 4, wherein the first polymer comprises about 55% to about 64% by weight of the skin layer, the second polymer comprises about 35% to about 44% by weight of the skin layer, and the compatibilizer comprises about 1% to about 3% by weight of the skin layer.

6. The multilayer breathable stretched-thinned film of claim 1, wherein the compatibilizer is a graft copolymer, a block copolymer or a mixture thereof.

7. The multilayer breathable stretched-thinned film of claim 1, wherein the thermoplastic polymer of the core layer is a polyolefin or a copolymer comprising units derived from an olefinic monomer and the filler of the core layer comprises an inorganic particulate filler and/or a polymeric filler.

8. The multilayer breathable stretched-thinned film of claim 1, wherein the first polymer comprises atactic polyproplyene, the second polymer comprises low-density polyethylene and the compatibilizer comprises EPDM.

9. The multilayer breathable stretched-thinned film of claim 5, wherein the first polymer comprises atactic polyproplyene, the second polymer comprises low-density polyethylene and the compatibilizer comprises EPDM.

10. The multilayer breathable stretched-thinned film of claim 1, wherein the first polymer comprises polypropylene, the second polymer comprises polystyrene, and the compatiblizer comprises a (polystyrene/poly(ethylene-butylene)/polystyrene) block copolymer.

11. The multilayer breathable stretched-thinned film of claim 5, wherein the first polymer comprises polypropylene, the second polymer comprises polystyrene, and the compatiblizer comprises a (polystyrene/poly(ethylene-butylene)/polystyrene) block copolymer.

12. The multilayer breathable stretched-thinned film of claim 7, wherein the thermoplastic polymer of the core comprises linear low-density polyethylene and the filler comprises calcium carbonate.

13. The multilayer breathable stretched-thinned film of claim 12, wherein the first polymer comprises atactic polyproplyene, the second polymer comprises low-density polyethylene and the compatibilizer comprises EPDM.

14. The multilayer breathable stretched-thinned film of claim 12, wherein the first polymer comprises polypropylene, the second polymer comprises polystyrene, and the compatiblizer comprises a (polystyrene/poly(ethylene-butylene)/polystyrene) block copolymer.

15. The multilayer breathable stretched-thinned film of claim 1, wherein the film has a Water Vapor Transmission Rate (WVTR) of at least 300 g/m$^2$/day.

16. The multilayer breathable stretched-thinned film of claim 15, wherein the film has a Water Vapor Transmission Rate (WVTR) of at least 1500 g/m$^2$/day.

17. The multilayer breathable stretched-thinned film of claim 15, wherein the film has a Water Vapor Transmission Rate (WVTR) of at least 3000 g/m$^2$/day.

18. The multilayer breathable stretched-thinned film of claim 1, herein the film has a peel strength between the core layer and the skin layer of at least 30 grams.

19. The multilayer breathable stretched-thinned film of claim 18, wherein the film has a peel strength between the core layer and the skin layer of at least 40 grams.

20. A laminate comprising the multilayer breathable stretched-thinned film of claim 1 and a nonwoven web, wherein the nonwoven web is adjacent to the skin layer of the multilayer breathable film.

21. A person care product comprising the multilayer breathable stretched-thinned film of claim 1.

22. A person care product comprising the laminate of claim 20.

23. A protective cover comprising the multilayer breathable stretched-thinned film of claim 1.

24. An infection control product comprising the multilayer breathable stretched-thinned film of claim 1.

25. An infection control product comprising the laminate of claim 20.

26. A garment comprising the multilayer breathable stretched-thinned film of claim 1.

27. A garment comprising the laminate of claim 20.

28. A process for preparing a multilayer breathable film comprising:

coextruding a core layer and at least one skin layer to form a coextruded film having an initial length and an initial width, said core layer comprises a mixture of at least one thermoplastic polymer and a filler and said skin layer comprises a first polymer, a second polymer, and a third polymer wherein the first polymer and second polymer are incompatible with each another and the third polymer is a compatibilizer for the first polymer and the second polymer; and stretching the coextruded film in at least one direction of the width or length of the film to form a multilayer breathable film having voids or cracks in the core layer and cracks in the skin layer.

29. A process of preparing a breathable laminate comprising:

forming a breathable film by coextruding a core layer and at least one skin layer to form a coextruded film having an initial length and an initial width, said core layer comprises a mixture of at least one thermoplastic polymer and a filler and said skin layer comprises a first polymer, a second polymer, and a third polymer wherein the first polymer and second polymer are incompatible with each another and the third polymer is a compatibilizer for the first polymer and the second polymer; and stretching the coextruded film in at least one direction of the width or length of the film to form a multilayer breathable film having voids or cracks in the core layer and cracks in the skin layer, and laminating the film to a nonwoven web.

30. The multilayer breathable stretched-thin film of claim 1, comprising two skin layers wherein each skin layer is adjacent to the core layer.

* * * * *